United States Patent
Yang

(10) Patent No.: US 9,059,633 B2
(45) Date of Patent: Jun. 16, 2015

(54) ENERGY HARVEST SYSTEM AND THE METHOD THEREOF

(75) Inventor: Eric Yang, Saratoga, CA (US)

(73) Assignee: Monolithic Power Systems, Inc., San Jose, CA (US)

(*) Notice: Subject to any disclaimer, the term of this patent is extended or adjusted under 35 U.S.C. 154(b) by 744 days.

(21) Appl. No.: 13/332,668

(22) Filed: Dec. 21, 2011

(65) Prior Publication Data

US 2013/0162236 A1  Jun. 27, 2013

(51) Int. Cl.
*H01H 47/00* (2006.01)
*H01H 35/00* (2006.01)
*H01H 83/18* (2006.01)
*H02H 3/02* (2006.01)
*H02H 3/42* (2006.01)
*H02M 7/219* (2006.01)

(52) U.S. Cl.
CPC ...... *H02M 7/219* (2013.01); *H02M 2007/2195* (2013.01); *Y02B 70/1408* (2013.01)

(58) Field of Classification Search
CPC ... G01P 13/00; G01P 3/4802; A47L 15/4259; B41J 3/36; B65H 59/40; H02J 1/12; H02J 7/00; H02J 9/005; H02M 3/335; H02M 7/217; H01H 9/061; H01H 9/52; H02H 3/12

USPC .......... 307/126, 129, 99, 17, 113, 98, 72; 363/127, 116; 320/145, 162, 167

See application file for complete search history.

(56) References Cited

U.S. PATENT DOCUMENTS

| | | | |
|---|---|---|---|
| 2010/0060231 A1* | 3/2010 | Trainor et al. | 320/103 |
| 2011/0181115 A1* | 7/2011 | Ivanov | 307/72 |
| 2012/0126624 A1* | 5/2012 | Hester et al. | 307/77 |
| 2013/0049657 A1* | 2/2013 | Rozman et al. | 318/400.3 |

FOREIGN PATENT DOCUMENTS

CN  201110127485.7  5/2011

OTHER PUBLICATIONS

U.S. Appl. No. 13/310,306, filed May 2, 2011, Monolithic Power Systems.

* cited by examiner

*Primary Examiner* — Rexford Barnie
*Assistant Examiner* — Jagdeep Dhillon
(74) *Attorney, Agent, or Firm* — Perkins Coie LLP

(57) ABSTRACT

The present disclosure discloses an energy harvest system converting an AC source provided by an energy harvester to a desired voltage. The AC source is boosted to the desired voltage by a bi-directional booster converter comprising fourth controllable transistors configured in an H-bridge, and stored by a storage capacitor. The desired voltage is then used to power various loads.

19 Claims, 3 Drawing Sheets ing the AC source to a desired voltage by a bi-directional boost converter; and storing the desired voltage by a storage capacitor.

ENERGY HARVEST SYSTEM AND THE METHOD THEREOF

TECHNICAL FIELD

The present disclosure relates to electronic circuits, more specifically, the present disclosure relates to apparatus that converts small mechanical movements into electrical energy.

BACKGROUND

An energy harvester is a device that converts mechanical movements, such as vibrations, oscillations or other mechanical motions into electrical energy. This electrical energy can then be stored or used by other devices. Thus, an energy harvester could produce useful electrical power from mechanical movements. For example, the vibrations of an air duct could be converted to electrical energy by an energy harvester and the electrical energy could then be used to power a sensor that measures the temperature of air in that duct. Therefore, the sensor will not require electrical wiring to a remote source of power or periodic battery changes.

Conventional technology uses a schottky diode bridge (comprised by diodes D1~D4) and a boost converter to convert the electrical energy into desirable voltage levels to power various loads, as shown in FIG. 1. However, the schottky diode bridge is too lossy. In addition, when the electrical energy generated by the energy harvester is low, e.g., 0.5V, the schottky diode bridge can not kick startup, which limit the use of the electrical energy with low voltage.

SUMMARY

It is an object of the present disclosure to provide an energy harvest system, which solves the above problems.

In accomplishing the above and other objects, there has been provided, in accordance with an embodiment of the present disclosure, an energy harvest system, comprising: an energy harvester configured to provide an AC source, the energy harvest having a first terminal and a second terminal; a storage port configured to provide a storage voltage; a first transistor coupled between the first terminal of the energy harvester and the storage port; a second transistor coupled between the first terminal of the energy harvester and a reference ground; a third transistor coupled between the second terminal of the energy harvester and the storage port; a fourth transistor coupled between the second terminal of the energy harvester and the reference ground; and a storage capacitor coupled between the storage port and the reference ground; wherein the first transistor and the second transistor operate at relatively low switching frequency, while the third transistor and the fourth transistor operate at relatively high switching frequency.

In addition, there has been provided, in accordance with an embodiment of the present disclosure, a method for apparatus with energy harvester, comprising: generating an AC source from mechanical movements by an energy harvester; boost- Furthermore, there has been provided, in accordance with an embodiment of the present disclosure, an energy harvest system, comprising: an inductor and an AC source generator coupled in series, wherein the AC source generator is configured to provide an AC source; a storage port configured to provide a storage voltage; a first transistor coupled between the inductor and the storage port; a second transistor coupled between the inductor and a reference ground; a third transistor coupled between the AC source generator and the storage port; a fourth transistor coupled between the AC source generator and the reference ground; and a storage capacitor coupled between the storage port and the reference ground; wherein when the AC source is positive, the first transistor is controlled to be ON, the second transistor is controlled to be OFF, and the third transistor and the fourth transistor are controlled to switch between ON and OFF states; and when the AC source is negative, the first transistor is controlled to be OFF, the second transistor is controlled to be ON, and the third transistor and the fourth transistor are controlled to switch between ON and OFF states to provided the storage voltage at the storage port.

The use of the similar reference label in different drawings indicates the same of like components.

DETAILED DESCRIPTION

Embodiments of circuits for energy harvest system with low output voltage are described in detail herein. In the following description, some specific details, such as example circuits for these circuit components, are included to provide a thorough understanding of embodiments of the disclosure. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 2:
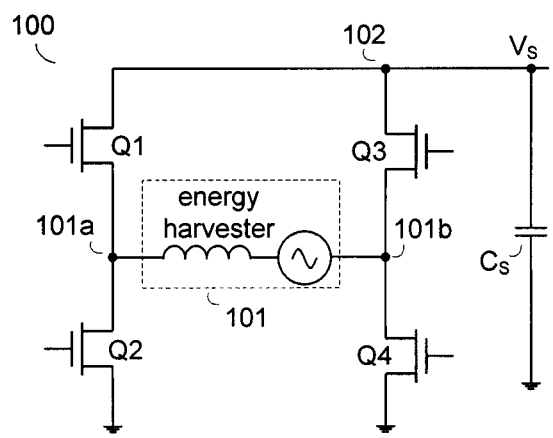
FIG. 2 schematically shows an energy harvest system 100 in accordance with an embodiment of the present disclosure.

FIG. 2 schematically shows an energy harvest system 100 in accordance with an embodiment of the present disclosure. In the example of FIG. 2, the energy harvest system 100 comprises: an energy harvester 101 configured to provide an AC source, the energy harvest 101 having a first terminal 101a and a second terminal 101b; a storage port 102 configured to provide a storage voltage $V_s$; a first transistor Q1 coupled between the first terminal 101a of the energy harvester and the storage port 102; a second transistor Q2 coupled between the first terminal 101a of the energy harvester and a reference ground; a third transistor Q3 coupled between the second terminal 101b of the energy harvester and the storage port 102; a fourth transistor Q4 coupled between the second terminal 101b of the energy harvester and the reference ground; and a storage capacitor $C_s$ coupled between the storage port 102 and the reference ground; wherein the first transistor Q1 and the second transistor Q2 operate at relatively low switching frequency, while the third transistor Q3 and the fourth transistor Q4 operate at relatively high switching frequency.

In one embodiment, the energy harvest comprises an inductor and an AC source generator coupled in series.

In one embodiment, the AC source generator comprises a vibrator generator.

In one embodiment, the first to fourth transistors Q1~Q4 are characterized in low gate-threshold.

In one embodiment, the AC source having a frequency range of 10~50 Hz.

During the operation of the energy harvest system 100, when the AC source is positive, e.g., the first terminal 101a of the energy harvester is electrical positive and the second terminal 101b of the energy harvester is electrical negative, the first transistor Q1 is controlled to be ON, the second transistor Q2 is controlled to be OFF, and the third transistor Q3 and the fourth transistor Q4 are controlled to switch between ON and OFF states. As a result, the energy harvest system 100 forms a boost converter, and the AC source is boosted to a higher storage voltage. On the contrary, when the AC source is negative, e.g., the first terminal 101a of the energy harvester is electrical negative and the second terminal 101b of the energy harvester is electrical positive, the first transistor Q1 is controlled to be OFF, the second transistor Q2 is controlled to be ON, and the third transistor Q3 and the fourth transistor Q4 are controlled to switch between ON and OFF states. As a result, the energy harvest system 100 also forms a boost converter, and the AC source is also boosted to a higher storage voltage. A storage voltage $V_s$ with desired voltage level is regulated by applying appropriate control scheme to the third transistor Q3 and the fourth transistor Q4.

Figure 3:
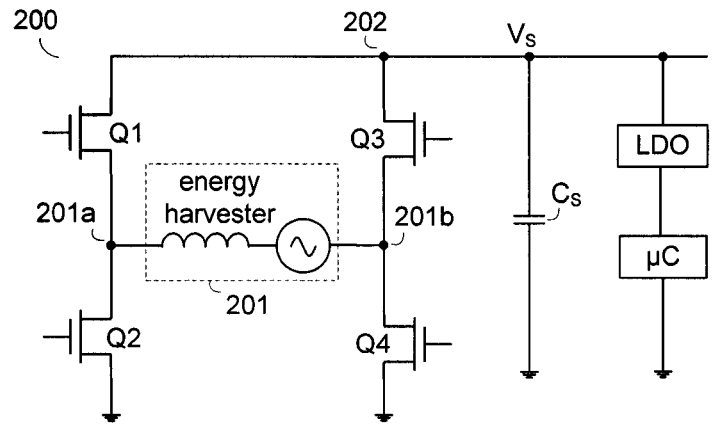
FIG. 3 schematically shows an energy harvest system 200 in accordance with an embodiment of the present disclosure.

The storage voltage $V_s$ generated by the energy harvest system may be used to power variable loads, as shown in FIG. 3, an energy harvest system 200 powering a micro-controller through a LDO (low dropout) is schematically illustrated. Specifically speaking, the energy harvest system 200 comprises an energy harvester 201, first to fourth transistors Q1~Q4, and a storage capacitor $C_s$ coupled similarly as those in the energy harvest system 100 in FIG. 2. The energy harvest system 200 further comprises a LDO and a Micro-controller μC coupled in series between the storage port 202 and the reference ground.

In one embodiment, the Micro-controller μC wasters low power, and may be used to execute sensing, testing, monitoring, and etc.

Figure 4:
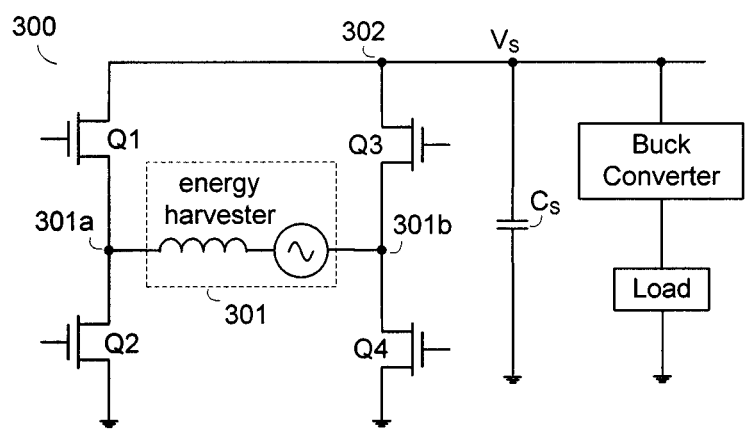
FIG. 4 schematically shows an energy harvest system 300 in accordance with an embodiment of the present disclosure.

When the system needs measure, calibration, data transmission, etc., a buck converter may be needed. FIG. 4 schematically shows an energy harvest system 300 powering a load via a buck converter in accordance with an embodiment of the present disclosure. Similarly, the energy harvest system 300 comprises an energy harvester 301, first to fourth transistors Q1~Q4, and a storage capacitor $C_s$ coupled similarly as those in the energy harvest system 100 in FIG. 2, and the energy harvest system 300 further comprises a buck converter and a load coupled in series between the storage port 302 and the reference ground.

In one embodiment, the buck converter comprises a synchronous buck converter.

Figure 1:
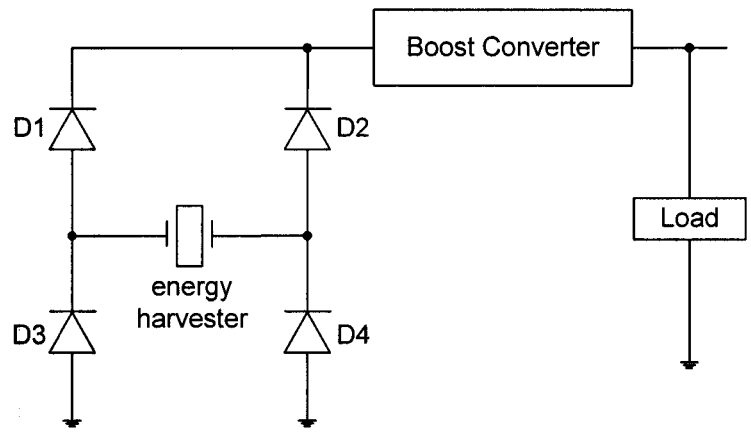
FIG. 1 schematically shows a prior art energy harvest system converting electrical energy generated by energy harvester to desirable voltage levels to power various loads.

Several embodiments of the foregoing energy harvest system provide desired voltage level with reduced power loss and simple structure compared to conventional technique discussed above with reference to FIG. 1. Unlike the conventional technique, several embodiments of the foregoing energy harvest system comprise controllable transistors to form a bi-directional boost, thus reducing the power loss and getting easily started up in low AC power source with simple structure.

Figure 5:
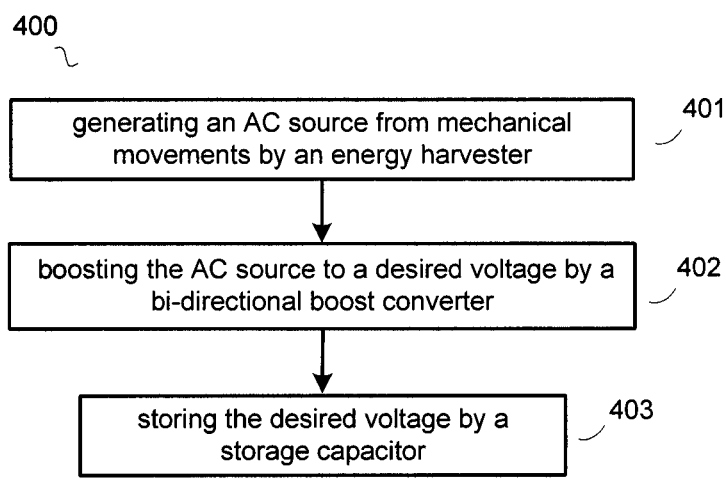
FIG. 5 schematic shows a flowchart 400 in accordance with an embodiment of the present disclosure.

FIG. 5 schematic shows a flowchart 400 of a method for apparatus with energy harvester in accordance with an embodiment of the present disclosure. The method comprises:

Step 401, generating an AC source from mechanical movements by an energy harvester.

Step 402, boosting the AC source to a desired voltage by a bi-directional boost converter. In one embodiment, the bi-directional boost converter comprises fourth transistors configured in an H-bridge, wherein the H-bridge has a first bridge arm operating at relatively low frequency and a second bridge arm operating at relatively high frequency. In one embodiment the fourth transistors are characterized in low gate-threshold. And Step 403, storing the desired voltage by a storage capacitor.

In one embodiment, the method further comprises powering a Micro-controller via a LDO.

In one embodiment, the method further comprises powering a load via a buck converter.

This written description uses examples to disclose the disclosure, including the best mode, and also to enable a person skilled in the art to make and use the disclosure. The patentable scope of the disclosure may include other examples that occur to those skilled in the art.

I claim:

1. An energy harvest system, comprising:
   an energy harvester configured to provide an AC source, the energy harvest having a first terminal and a second terminal;
   a storage port configured to provide a storage voltage;
   a first transistor coupled between the first terminal of the energy harvester and the storage port;
   a second transistor coupled between the first terminal of the energy harvester and a reference ground;
   a third transistor coupled between the second terminal of the energy harvester and the storage port;
   a fourth transistor coupled between the second terminal of the energy harvester and the reference ground; and
   a storage capacitor coupled between the storage port and the reference ground; wherein
   the first transistor and the second transistor operate at relatively low switching frequency, while the third transistor and the fourth transistor operate at relatively high switching frequency.

2. The energy harvest system of claim 1, wherein the energy harvest comprises an inductor and an AC source generator coupled in series.

3. The energy harvest system of claim 2, wherein the AC source generator comprises a vibrator generator.

4. The energy harvest system of claim 2, wherein
   when the AC source is positive, the first transistor is controlled to be ON, the second transistor is controlled to be OFF, and the third transistor and the fourth transistor are controlled to switch between ON and OFF states; and
   when the AC source is negative, the first transistor is controlled to be OFF, the second transistor is controlled to be ON, and the third transistor and the fourth transistor are controlled to switch between ON and OFF states.

5. The energy harvest system of claim 1, further comprising a LDO and a Micro-controller coupled in series between the storage port and the reference ground.

6. The energy harvest system of claim 5, wherein Micro-controller is used to execute sensing, testing, monitoring.

7. The energy harvest system of claim 1, further comprising a buck converter and a load coupled in series between the storage port and the reference ground.

8. The energy harvest system of claim 7, wherein the buck converter comprises a synchronous buck converter.

9. The energy harvest system of claim 7, wherein the load is functioned as measure, or calibration, or data transmission.

10. The energy harvest system of claim 1, wherein the first to fourth transistors are characterized in low gate-threshold.

11. The energy harvest system of claim 1, wherein the AC source having a frequency range of 10~50Hz.

12. A method for apparatus with energy harvester, comprising:
generating an AC source from mechanical movements by an energy harvester;
boosting the AC source to a desired voltage by a bi-directional boost converter; and
storing the desired voltage by a storage capacitor; wherein the bi-directional boost converter comprises four transistors configured in an H-bridge, wherein the H-bridge has a first bridge arm operating at relatively low frequency and a second bridge arm operating at relatively high frequency.

13. The method of claim 12, wherein the four transistors are characterized in low gate-threshold.

14. The method of claim 12, further comprising powering a Micro-controller via a LDO.

15. The method of claim 12, further comprising powering a load via a buck converter.

16. An energy harvest system, comprising:
an inductor and an AC source generator coupled in series, wherein the AC source generator is configured to provide an AC source;
a storage port configured to provide a storage voltage;
a first transistor coupled between the inductor and the storage port;
a second transistor coupled between the inductor and a reference ground;
a third transistor coupled between the AC source generator and the storage port;
a fourth transistor coupled between the AC source generator and the reference ground; and
a storage capacitor coupled between the storage port and the reference ground; wherein
when the AC source is positive, the first transistor is controlled to be ON, the second transistor is controlled to be OFF, and the third transistor and the fourth transistor are controlled to switch between ON and OFF states; and when the AC source is negative, the first transistor is controlled to be OFF, the second transistor is controlled to be ON, and the third transistor and the fourth transistor are controlled to switch between ON and OFF states to provide the storage voltage at the storage port.

17. The energy harvest system of claim 16, wherein the first to fourth transistors are characterized in low gate-threshold.

18. The energy harvest system of claim 16, wherein the AC source generator comprises a vibrator generator.

19. The energy harvest system of claim 16, wherein the AC source having a frequency range of 10~50Hz.

* * * * *